(12) United States Patent
Han

(10) Patent No.: US 11,449,857 B2
(45) Date of Patent: Sep. 20, 2022

(54) CODE SCANNING METHOD, CODE SCANNING DEVICE AND MOBILE TERMINAL

(71) Applicant: VIVO MOBILE COMMUNICATION CO., LTD., Dongguan (CN)

(72) Inventor: Xu Han, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 189 days.

(21) Appl. No.: 16/766,380

(22) PCT Filed: Nov. 21, 2018

(86) PCT No.: PCT/CN2018/116677
§ 371 (c)(1),
(2) Date: May 22, 2020

(87) PCT Pub. No.: WO2019/101097
PCT Pub. Date: May 31, 2019

(65) Prior Publication Data
US 2020/0349551 A1 Nov. 5, 2020

(30) Foreign Application Priority Data
Nov. 23, 2017 (CN) .......................... 201711180371.2

(51) Int. Cl.
*G06Q 20/32* (2012.01)
*G06F 9/451* (2018.01)
(Continued)

(52) U.S. Cl.
CPC ......... *G06Q 20/3276* (2013.01); *G06F 9/451* (2018.02); *G06K 7/10722* (2013.01);
(Continued)

(58) Field of Classification Search
None
See application file for complete search history.

(56) References Cited

U.S. PATENT DOCUMENTS

2013/0167208 A1 6/2013 Shi
2013/0275308 A1* 10/2013 Paraskeva .......... G06Q 20/3224
705/44
(Continued)

FOREIGN PATENT DOCUMENTS

CN 103366149 A 10/2013
CN 103745186 A 4/2014
(Continued)

OTHER PUBLICATIONS

Extended European Search Report related to Application No. 18880997.4; dated Nov. 20, 2020.
(Continued)

*Primary Examiner* — Gregory S Cunningham, II
(74) *Attorney, Agent, or Firm* — von Briesen & Roper, s.c.

(57) ABSTRACT

The present disclosure provides a code scanning method, a code scanning device and a mobile terminal. When the mobile terminal is in a power-on state, a camera of the mobile terminal is normally on. The method includes: capturing an image with the camera, and identifying a captured target image; when identifying that the target image has an image feature of a preset graphic identification code, acquiring a target graphic identification code in the target image; decoding the target graphic identification code to obtain an access link corresponding to the target graphic identification code; and running a target application corresponding to the access link, and displaying an access interface corresponding to the access link.

6 Claims, 6 Drawing Sheets

(51) Int. Cl.
*G06K 7/14* (2006.01)
*G06Q 20/40* (2012.01)
*H04B 1/3827* (2015.01)
*H04L 67/02* (2022.01)
*G06K 7/10* (2006.01)

(52) U.S. Cl.
CPC ......... *G06K 7/1417* (2013.01); *G06Q 20/401* (2013.01); *H04B 1/3827* (2013.01); *H04L 67/02* (2013.01)

(56) References Cited

U.S. PATENT DOCUMENTS

| | | | |
|---|---|---|---|
| 2013/0278622 A1* | 10/2013 | Sun | G06Q 20/325 |
| | | | 345/589 |
| 2014/0040120 A1* | 2/2014 | Cho | G06Q 20/3278 |
| | | | 705/39 |
| 2015/0254630 A1* | 9/2015 | Royyuru | G06Q 20/322 |
| | | | 705/39 |
| 2016/0132706 A1 | 5/2016 | Huang et al. | |
| 2017/0228570 A1 | 8/2017 | Clark et al. | |
| 2018/0032997 A1* | 2/2018 | Gordon | G06Q 30/0269 |
| 2018/0246623 A1* | 8/2018 | Peled | G06F 3/04886 |

FOREIGN PATENT DOCUMENTS

| | | |
|---|---|---|
| CN | 105512881 A | 4/2016 |
| CN | 105577658 A | 5/2016 |
| CN | 106681611 A | 5/2017 |
| CN | 106709392 A | 5/2017 |
| CN | 106875181 A | 6/2017 |
| CN | 106934279 A | 7/2017 |
| CN | 107016125 A | 8/2017 |
| CN | 107066863 A | 8/2017 |
| CN | 107248072 A | 10/2017 |
| CN | 107944325 A | 4/2018 |

OTHER PUBLICATIONS

International Search Report & Written Opinion related to Application No. PCT/CN2018/116677; dated Jun. 4, 2020.
Chinese Search Report related to Application No. 201711180371.2; dated Nov. 16, 2018.
European Office Action related to Application No. 18880997.4 dated May 4, 2022.

\* cited by examiner

CODE SCANNING METHOD, CODE SCANNING DEVICE AND MOBILE TERMINAL

CROSS-REFERENCE TO RELATED APPLICATION

The present disclosure is the U.S. national phase of PCT Application PCT/CN2018/116677 filed on Nov. 21, 2018, which claims the benefit and priority of Chinese Application No. 201711180371.2 filed on Nov. 23, 2017, the disclosures of which are incorporated in their entirety by reference herein.

TECHNICAL FIELD

The present disclosure relates to the field of communication technologies, and in particular to a code scanning method, a code scanning device and a mobile terminal.

BACKGROUND

With the increasing popularity of mobile terminals and the widespread application of graphic identification codes, people often use mobile terminals to scan graphic identification codes (such as quick response (QR) codes) to complete functions such as online payment, downloading applications and accessing websites. Taking scanning QR code as an example, when a screen of a mobile terminal is in a screen-off state, if a user needs to scan a QR code to complete a certain function such as online payment, the user needs to first light up and unlock the screen, find a corresponding application and run the application, and then turn on a code scanning function of the application and scan a target QR code, and finally authorize payment on a payment interface that jumps after the scanning code succeeds.

It can be seen that in the related art, when scanning a code with the mobile terminal, the user needs to perform many manual operations, which results in low efficiency of scanning code and poor scanning code experience.

SUMMARY

In a first aspect, one embodiment of the present disclosure provides a code scanning method applied to a mobile terminal with a camera normally on when the mobile terminal is in a power-on state. The method includes:

capturing an image with the camera and identifying a captured target image;

when identifying that the target image has an image feature of a preset graphic identification code, acquiring a target graphic identification code in the target image;

decoding the target graphic identification code to obtain an access link corresponding to the target graphic identification code; and running a target application corresponding to the access link and displaying an access interface corresponding to the access link.

In a second aspect, one embodiment of the present disclosure provides a code scanning device applied to a mobile terminal with a camera normally on when the mobile terminal is in a power-on state. The code scanning device includes:

a capturing-identification module used to capture an image with the camera and identify a captured target image;

an acquisition module used to, when identifying that the target image has an image feature of a preset graphic identification code, acquire a target graphic identification code in the target image;

a decoding module used to decode the target graphic identification code to obtain an access link corresponding to the target graphic identification code; and a run-display module used to run a target application corresponding to the access link and display an access interface corresponding to the access link.

In third first aspect, one embodiment of the present disclosure provides a mobile terminal including: a processor; a memory, and a computer program stored on the memory and executable on the processor. The computer program is executed by the processor to implement steps of the above code scanning method.

In the embodiment of the present disclosure, when the mobile terminal is in the power-on state, the camera of the mobile terminal is normally on, and thus the mobile terminal can directly capture an image of the graphic identification code through the camera, and the access link corresponding to the graphic identification code can be determined through corresponding identification and decoding processing, and finally the graphic identification code can be scanned by naming the application corresponding to the access link and displaying the access interface corresponding to the access link.

BRIEF DESCRIPTION OF THE DRAWINGS

In order to more clearly illustrate technical solutions of the present disclosure, drawings to be used in the description of the present disclosure will be described briefly hereinafter. Apparently, the drawings described hereinafter are only some embodiments of the present disclosure, and other drawings may be obtained by those skilled in the art according to those drawings without creative work.

DETAILED DESCRIPTION

The technical solutions of the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

Embodiments of the present disclosure provide a code scanning method, a code scanning device and a mobile terminal, which can solve the problem in the related art that a user needs to perform many manual operations when scanning a code with the mobile terminal, which results in low efficiency of scanning code and poor scanning code experience.

Figure 1:
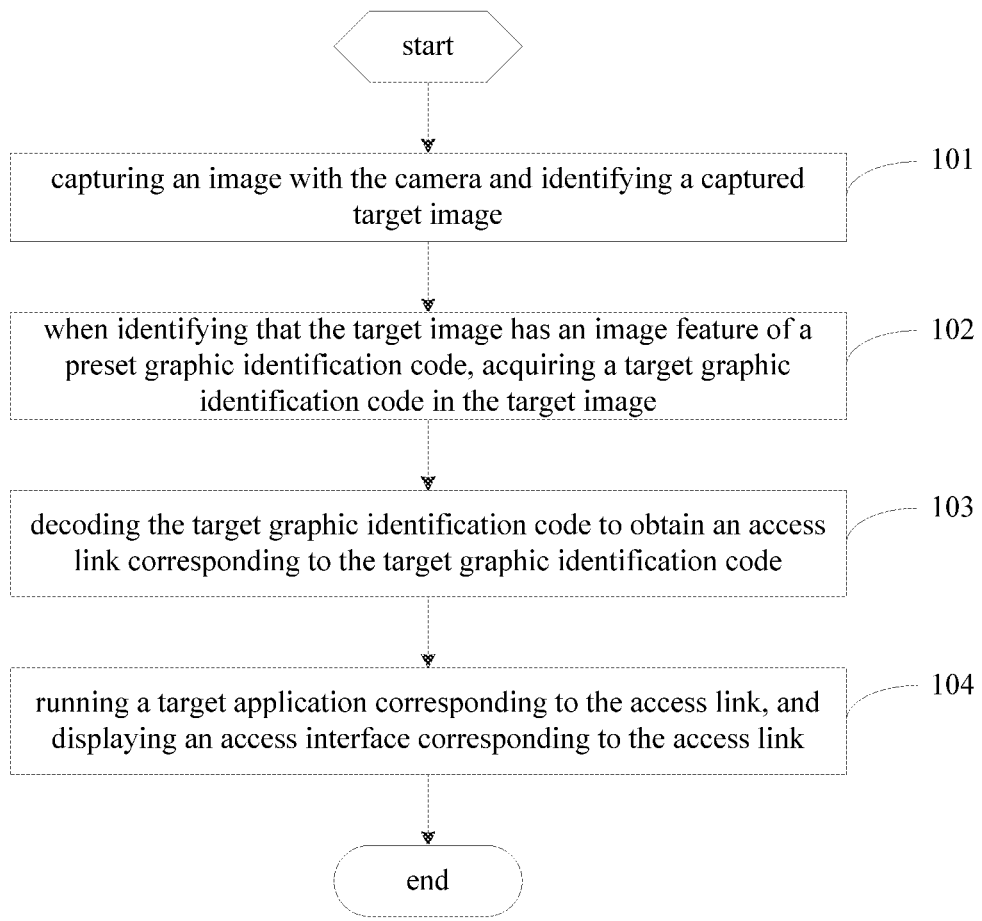
FIG. 1 is a flowchart of a code scanning method according to an embodiment of the present disclosure.

Referring to FIG. 1, FIG. 1 is a flowchart of a code scanning method according to an embodiment of the present disclosure. The method is applied to a mobile terminal. When the mobile terminal is in a power-on state, a camera of the mobile terminal is normally on. As shown in FIG. 1, the method includes the following steps.

Step 101: capturing an image with the camera, and identifying a captured target image.

In one embodiment, when the mobile terminal is in the power-on state, the camera of the mobile terminal is normally on, that is, the mobile terminal is provided with a camera which is always in an operating state. For example, the mobile terminal may be provided with a camera with low power consumption, and the camera is always in the operating state when the mobile terminal is in the power-on state. In this way, the mobile terminal can directly capture images through the camera without having to first turn on the camera through an application in the mobile terminal.

Figure 2:
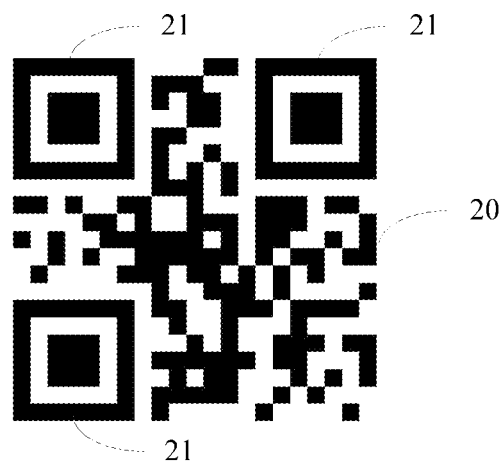
FIG. 2 is another flowchart of a code scanning method according to an embodiment of the present disclosure.

In this step, the image is captured by the camera, and the captured target image is identified to determine whether the captured target image has an image feature of a preset graphic identification code. The preset graphic identification code may be an identification code such as a one-dimensional barcode or a quick response (QR) code. Usually, these graphic identification codes have some unique features. For example, as shown in FIG. 2, a top-left corner, a top-right corner and a bottom-left corner of a QR code 20 each contains a finder pattern 21 displayed as a square within a square, which is a unique positioning pattern of the QR code.

In this way, in the step, the camera can be directly used to capture images, and the captured target image can be identified. Therefore, it can be preliminarily determined whether the image captured by the camera has the image feature of the preset graphic identification code.

Step 102: when identifying that the target image has an image feature of a preset graphic identification code, acquiring a target graphic identification code in the target image.

In this step, when it is identified that the target image has the image feature of the preset graphic identification code, the target graphic identification code in the target image may be acquired. For example, after it is identified that the target image has the image feature of the preset graphic identification code, the target image may be further identified, such as identifying an area having the image feature of the preset graphic identification code in the target image, thereby obtaining the target graphic identification code in the target image.

In this way, after identifying that the target image has the image feature of the preset graphic identification code, the target graphic identification code in the target image may be acquired. Therefore, subsequent decoding processing can be performed on the target graphic identification code.

Step 103: decoding the target graphic identification code to obtain an access link corresponding to the target graphic identification code.

In this step, the target graphic identification code may be decoded to obtain the access link corresponding to the target graphic identification code. Since the graphic identification code generally encodes certain information according to a certain encoding rule into a binary and is formed by black and white cells, by performing decoding processing on the target graphic identification code, information included in the target graphic identification code can be obtained, thereby obtaining the corresponding access link.

In this way, in this step, by performing decoding processing on the target graphic identification code, the access link corresponding to the target graphic identification code can be obtained, then an application associated with access link can be determined according to the access link, and then the access link can be opened through the application.

Step 104: running a target application corresponding to the access link, and displaying an access interface corresponding to the access link.

In this step of running a target application corresponding to the access link, and displaying an access interface corresponding to the access link, the target application corresponding to the access link may be determined first, then the target application is run to display the access interface corresponding to the access link. Generally, different graphic identification codes need to be scanned by different applications before they can be opened. For example, the QR code used for WeChat payment needs to be scanned by the WeChat application, and the QR code used for Alipay payment needs to be scanned by the Alipay application. Therefore, in this step, the target application corresponding to the access link may be run, and the access interface corresponding to the access link is displayed by the target application.

In this way, in this step, by running the target application corresponding to the access link and displaying the access interface corresponding to the access link, it can achieve the purpose of intelligently returning a scanning code processing result without the user manually opening the target application and opening a code-scanning function in advance.

In one embodiment of the present disclosure, the mobile terminal may be any device having a storage medium, such as a computer, a mobile phone, a tablet personal computer, a laptop computer, a personal digital assistant (PDA), a mobile interact device (MID) or a wearable device.

In this embodiment, when the mobile terminal is in the power-on state, the camera of the mobile terminal is normally on, and thus the mobile terminal can directly capture an image of the graphic identification code through the camera, and the access link corresponding to the graphic identification code can be determined through corresponding identification and decoding processing, and finally the graphic identification code can be scanned by running the application corresponding to the access link and displaying the access interface corresponding to the access link. In this way, when scanning a code with the mobile terminal, there is no need for the user to manually open the code-scanning application and open a code-scanning function, thereby greatly saving the user's operation time, providing higher scanning efficiency and improving the user's experience of using the mobile terminal to scan codes.

Figure 3:
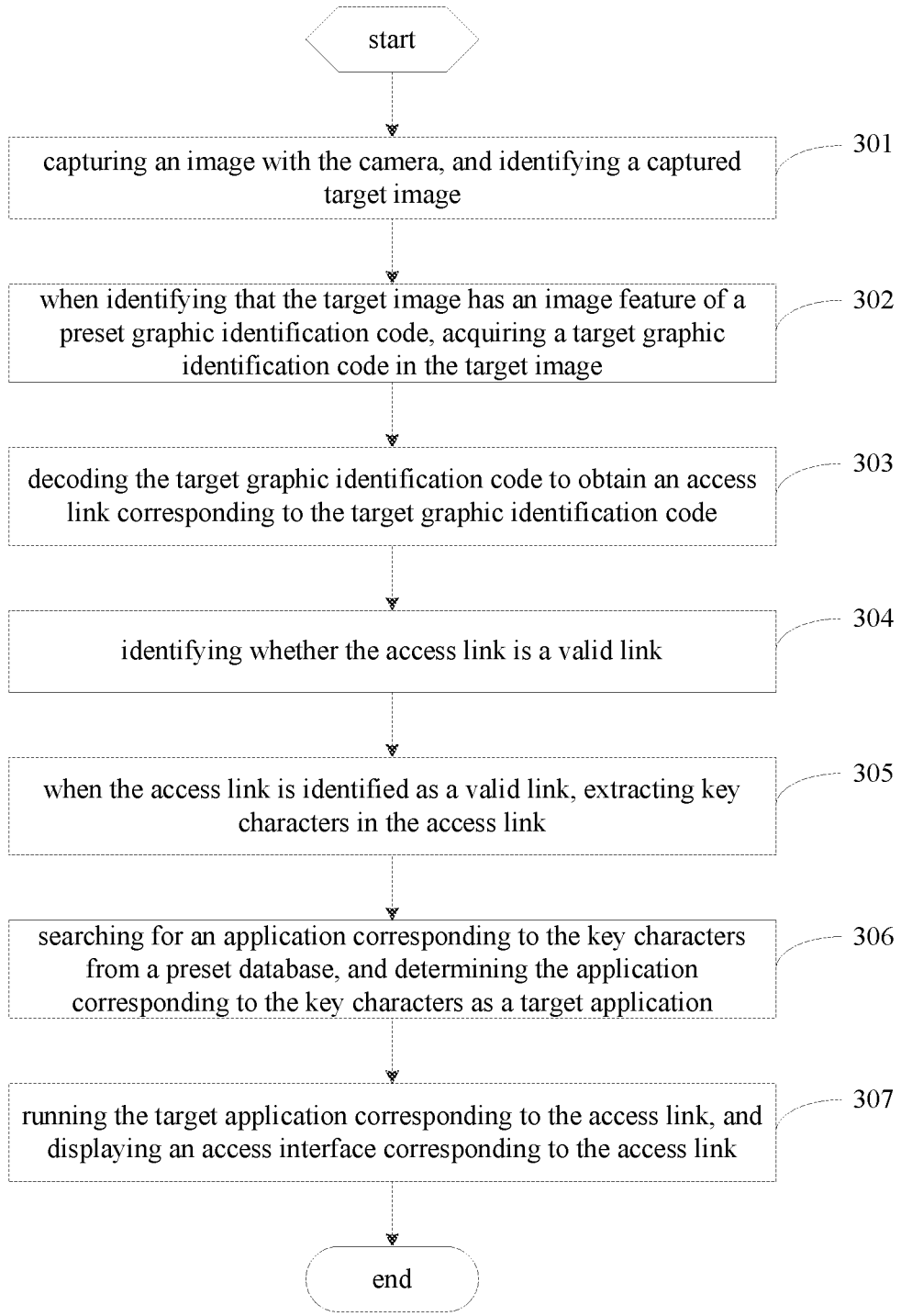
FIG. 3 is a schematic diagram of a quick response code according to an embodiment of the present disclosure.

Referring to FIG. 3, FIG. 3 is a flowchart of another code scanning method according to an embodiment of the present disclosure. The method is applied to a mobile terminal. When the mobile terminal is in a power-on state, a camera of the mobile terminal is normally on. As shown in FIG. 3, the method includes the following steps.

Step 301: capturing an image with the camera, and identifying a captured target image.

The specific implementation manner of this step may refer to the implementation manner of the step 101 in the method embodiment shown in FIG. 1, and the same beneficial effects can be achieved. To avoid repetition, details are not described herein again.

Step 302: when identifying that the target image has an image feature of a preset graphic identification code, acquiring a target graphic identification code in the target image.

The specific implementation manner of this step may refer to the implementation manner of the step 102 in the method embodiment shown in FIG. 1, and the same beneficial effects can be achieved. To avoid repetition, details are not described herein again.

Step 303: decoding the target graphic identification code to obtain an access link corresponding to the target graphic identification code.

The specific implementation manner of this step may refer to the implementation manner of the step 103 in the method embodiment shown in FIG. 1, and the same beneficial effects can be achieved. To avoid repetition, details are not described herein again.

Step 304: identifying whether the access link is a valid link.

In this step, after obtaining the access link corresponding to the target graphic identification code, it may first identify whether the access link is a valid link, for example, identifying whether the access link is a complete link address or an obviously wrong link address, or accessing the access link in the background to determine whether the access link can be accessed normally. If the access link is a complete and correct link address and can be accessed normally, the access link may be determined to be a valid link.

In this step, by identifying whether the access link is a valid link, it can be ensured that subsequent steps are performed only when the access link is identified as a valid link, thereby avoiding unnecessary steps if the access link is invalid. Therefore, system resources can be saved, and the accuracy of the graphic identification code can be improved to a certain extent.

Step 305: when the access link is identified as a valid link, extracting key characters in the access link.

In this step, when the access link is identified as a valid link, the key characters in the access link may be extracted to determine an application corresponding to the access link according to the key characters. The key characters may be characters in the access link indicating the application corresponding to the access link. Generally, content of the key characters may be determined through components of the access link, for example, if an access link is "http://weixin.qq.com/xxxx.url", then key characters "weixin" can be extracted therefrom; and if an access link is "https://qr.alipay.com/xxx", then key characters "alipay" can be extracted therefrom.

In this step, when the access link is identified as a valid link, the key characters in the access link may be extracted, and the application corresponding to the access link may be determined according to the key characters. Then, the access link can be opened through the application.

Step 306: searching for an application corresponding to the key characters from a preset database, and determining the application corresponding to the key characters as the target application.

The preset database may be a local database or a server database. Corresponding relationship between key characters and applications may be pre-established in the preset database. Thus, in this step, an application corresponding to the key characters may be searched from the preset database, and the application corresponding to the key characters is determined as the target application. Specifically, it may be preferred to search from the local database, and if the search is unsuccessful, then search from the server database.

In this way, in the step, by searching for an application corresponding to the key characters from the preset database and determining the application corresponding to the key characters as the target application, the target application corresponding to the access link can be determined, and then an access interface corresponding to the access link may be displayed through the target application.

Step 307: running the target application corresponding to the access link, and displaying an access interface corresponding to the access link.

The specific implementation manner of this step may refer to the implementation manner of the step 104 in the method embodiment shown in FIG. 1, and the same beneficial effects can be achieved. To avoid repetition, details are not described herein again.

Optionally, the step 307 includes:

judging whether the mobile terminal is installed with the target application;

when determining that the mobile terminal is installed with the target application, running the target application installed on the mobile terminal, and displaying the access interface corresponding to the access link by the target application;

when determining that the mobile terminal is not installed with the target application, running an applet corresponding to the target application, and displaying the access interface corresponding to the access link by the applet.

In this implementation manner, after the target application corresponding to the access link is determined, it may be first determined whether the mobile terminal is installed with the target application. Specifically, whether the mobile terminal is installed with the target application may be determined by determining whether the target application can be found from applications installed on the mobile terminal.

When determining that the mobile terminal is installed with the target application, the target application installed on the mobile terminal runs, and the access interface corresponding to the access link may be displayed by the target application. When determining that the mobile terminal is not installed with the target application, the applet corresponding to the target application runs, and the access interface corresponding to the access link may be displayed by the applet. Specifically, the mobile terminal may find installed applications associated with the applet. If there are multiple applications associated with the applet, an application with the highest priority among the applications associated with the applet installed on the mobile terminal may be determined according to a preset priority. Then, the applet of the application with the highest priority runs and the access interface corresponding to the access link is displayed through the applet. For example, if the target application is a bike sharing application, the mobile terminal is not installed with the bike sharing application and the mobile terminal is installed with another application (such as the WeChat application) which is associated with a bike sharing applet, then the bike sharing applet in the another application can be opened and the access interface corresponding to the access link is displayed through the bike sharing applet.

Optionally, when determining that the mobile terminal is not installed with the target application, corresponding prompt information may be output to prompt to download and install the target application or open an applet corresponding to the target application. For example, when determining that the mobile terminal is not installed with the target application, a pop-up reminder is output on a screen of the mobile terminal. The pop-up reminder displays a query message of "whether to download the target application" or "whether to open the applet corresponding to the application", and displays confirmation options of "yes" and "no" to allow the user to choose whether to download the target application or open the applet corresponding to the application. Then, the corresponding operation is performed according to the user's selection.

In this way, in this implementation manner, by determining whether the mobile terminal is installed with the target application, the access interface corresponding to the access link may be displayed in different manners according to a determination result. This not only can better ensure that the user views a result of scanning the code, but also enables the mobile terminal to have certain intelligence.

Of course, this implementation manner may also be applied to the embodiment shown in FIG. 1 and the same beneficial effects can be achieved.

Optionally, the access interface includes a payment interface.

The step of capturing an image with the camera of the mobile terminal and identifying the captured target image, includes:

when a screen of the mobile terminal is in a screen-off state, capturing an image with the camera of the mobile terminal and identifying the captured target image.

The step of running the target application corresponding to the access link and displaying the access interface corresponding to the access link, includes:

lighting up the screen of the mobile terminal, running the target application corresponding to the access link, and displaying the access interface corresponding to the access link.

After the step of lighting up the screen of the mobile terminal, running the target application corresponding to the access link, and displaying the access interface corresponding to the access link, the method further includes:

when an authorized payment operation is received, completing payment according to an input payment amount;

closing the target application and closing the screen of the mobile terminal.

In this implementation manner, the access interface may be a payment interface, that is, the method in this embodiment may be applied to scanning payment. In this implementation manner, since the camera of the mobile terminal is always on, the camera of the mobile terminal can be used to capture images when the screen of the mobile terminal is in the screen-off state, and the captured target image can be identified. In this way, when the user needs to scan a code, the user does not need to first light up the screen of the mobile terminal.

Specifically, the step of identifying the captured target image may be performed by a processor built in the camera. When identifying that the target image has an image feature of the preset graphic identification code, a QR code identification program in the mobile terminal can be awakened to decode and analyze the target image to obtain the access link corresponding to the target graphic identification code. When confirming that the access link is valid, the screen of the mobile terminal is lighted up, a target payment application corresponding to the access link runs, and a payment interface corresponding to the access link is displayed.

After displaying the access interface, when the authorized payment operation is received, the payment is completed according to the input payment amount. After the payment is completed, the target payment application may be closed, and the screen of the mobile terminal may be closed. In this way, by the code scanning method, the user can not only complete the scanning-code payment quickly, but also has better security guarantee. Further, after the payment is completed, the target payment application and the screen can be closed, thereby saving power and improving user experience.

Of course, this implementation manner may also be applied to the embodiment shown in FIG. 1 and the same beneficial effects can be achieved.

Optionally, the access interface includes a payment interface.

The step of capturing an image with the camera of the mobile terminal and identifying the captured target image, includes:

when the screen of the mobile terminal is in a screen-on state, capturing an image with the camera of the mobile terminal and identifying the captured target image.

After the step of running the target application corresponding to the access link and displaying the access interface corresponding to the access link, the method further includes:

when an authorized payment operation is received, completing payment according to an input payment amount;

closing the target application and returning to an interface displayed by the mobile terminal before displaying the payment interface.

In this implementation manner, when the screen of the mobile terminal is in the screen-on state, the camera of the mobile terminal can directly capture images and the captured target image may be identified. For example, when the mobile terminal displays a game interface, the user does not need to exit the game interface, and only needs to align the camera of the mobile terminal with a graphic identification code to be scanned, that is, a target payment application corresponding to the graphic identification code can be activated. Then, authorized payment can be performed on the payment interface displayed through the target payment application.

After the user completes the payment on the payment interface, the target payment application may be closed and the mobile terminal returns to the interface displayed before the mobile terminal displays the payment interface. For example, an interface displayed by the mobile terminal before the scanning-code payment is a game interface, then, after the user authorizes the payment, the target payment application can be closed and the mobile terminal returns to the game interface.

In this way, in this implementation manner, by the code scanning method, the user can quickly complete the scanning-code payment without being affected by the currently displayed interface. Further, after the payment is completed, the mobile terminal can return to the interface before the payment, thereby obtaining higher scanning efficiency and better user experience.

Of course, this implementation manner may also be applied to the embodiment shown in FIG. 1 and the same beneficial effects can be achieved.

In this embodiment, based on the embodiment shown in FIG. 1, the step of how to determine the target application corresponding to the access link is added, so that the target application corresponding to the access link can be quickly and accurately determined by the method described in this step. In addition, this embodiment further adds several optional implementation manners based on the embodiment shown in FIG. 1. These optional implementation manners may be implemented in combination with each other, or may be implemented separately, and all can achieve the technical effects of providing higher scanning efficiency and improving the user's experience of using the mobile terminal to scan codes.

Figure 4:
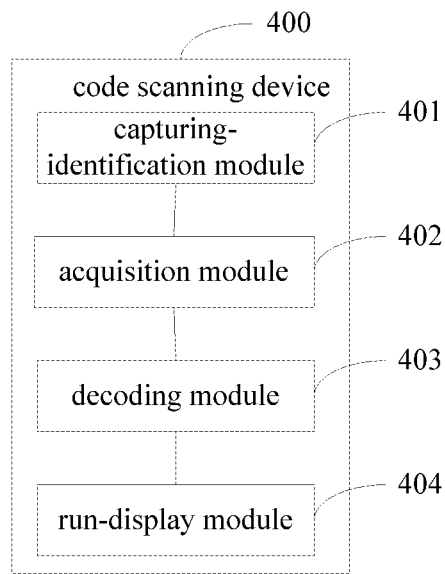
FIG. 4 is a block diagram of a code scanning device according to an embodiment of the present disclosure.

Referring to FIG. 4, FIG. 4 is a block diagram of a code scanning device according to an embodiment of the present disclosure. The code scanning device is applied to a mobile terminal. When the mobile terminal is in a power-on state, a camera of the mobile terminal is normally on. As shown in FIG. 4, the code scanning device 400 includes:

a capturing-identification module 401 used to capture an image with the camera and identify a captured target image;

an acquisition module 402 used to, when identifying that the target image has an image feature of a preset graphic identification code, acquire a target graphic identification code in the target image;

a decoding module 403 used to decode the target graphic identification code to obtain an access link corresponding to the target graphic identification code; and a run-display module 404 used to run a target application corresponding to the access link, and display an access interface corresponding to the access link.

Figure 5:
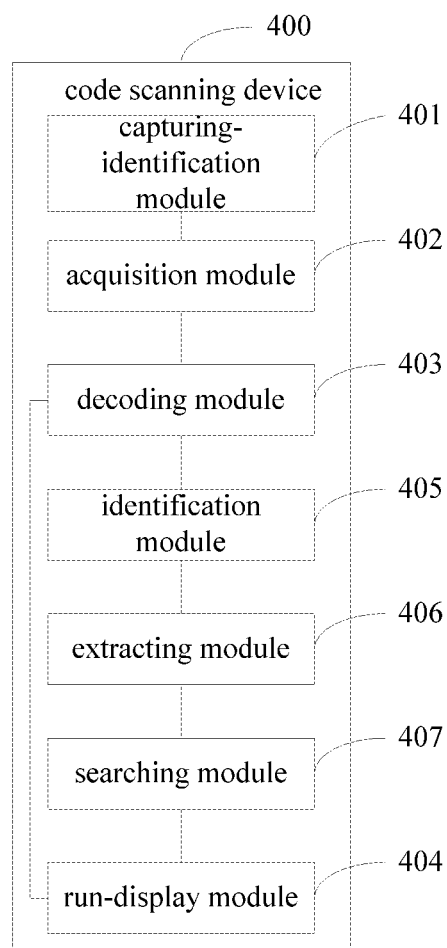
FIG. 5 is another block diagram of a code scanning device according to an embodiment of the present disclosure.

Optionally, as shown in FIG. 5, the code scanning device 400 further includes:

an identification module 405 used to identify whether the access link is a valid link;

an extracting module 406 used to extract key characters in the access link when the access link is identified as a valid link;

a searching module 407 used to search for an application corresponding to the key characters from a preset database, and determine the application corresponding to the key characters as a target application.

Figure 6:
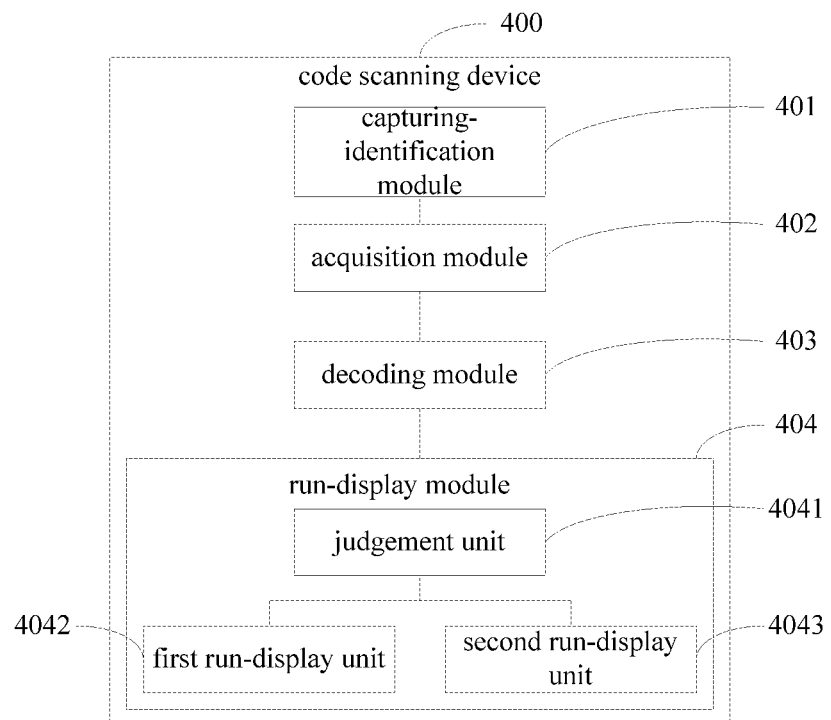
FIG. 6 is a block diagram of a code scanning device according to an embodiment of the present disclosure.

Optionally, as shown in FIG. 6, the run-display module 404 includes:

a judgement unit 4041 used to judge whether the mobile terminal is installed with the target application;

a first run-display unit 4042 used to, when determining that the mobile terminal is installed with the target application, run the target application installed on the mobile terminal, and display the access interface corresponding to the access link by the target application;

a second run-display unit 4043 used to, when determining that the mobile terminal is not installed with the target application, run an applet corresponding to the target application, and display the access interface corresponding to the access link by the applet.

Optionally, the access interface includes a payment interface.

The capturing-identification module 401 is used to, when a screen of the mobile terminal is in a screen-off state, capture an image with the camera of the mobile terminal and identify the captured target image.

The run-display module 404 is used to light up the screen of the mobile terminal, run the target application corresponding to the access link and display the access interface corresponding to the access link.

Figure 7:
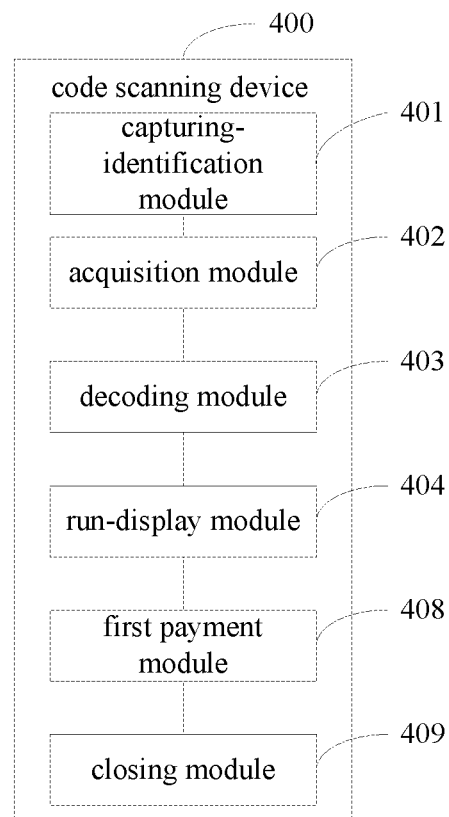
FIG. 7 is a block diagram of a code scanning device according to an embodiment of the present disclosure.

Optionally, as shown in FIG. 7, the code scanning device 400 further includes:

a first payment module 408 used to, when an authorized payment operation is received, complete payment according to an input payment amount;

a closing module 409 used to close the target application and close the screen of the mobile terminal.

Optionally, the access interface includes a payment interface.

The capturing-identification module 401 is used to, when the screen of the mobile terminal is in a screen-on state, capture an image with the camera of the mobile terminal and identify the captured target image.

Figure 8:
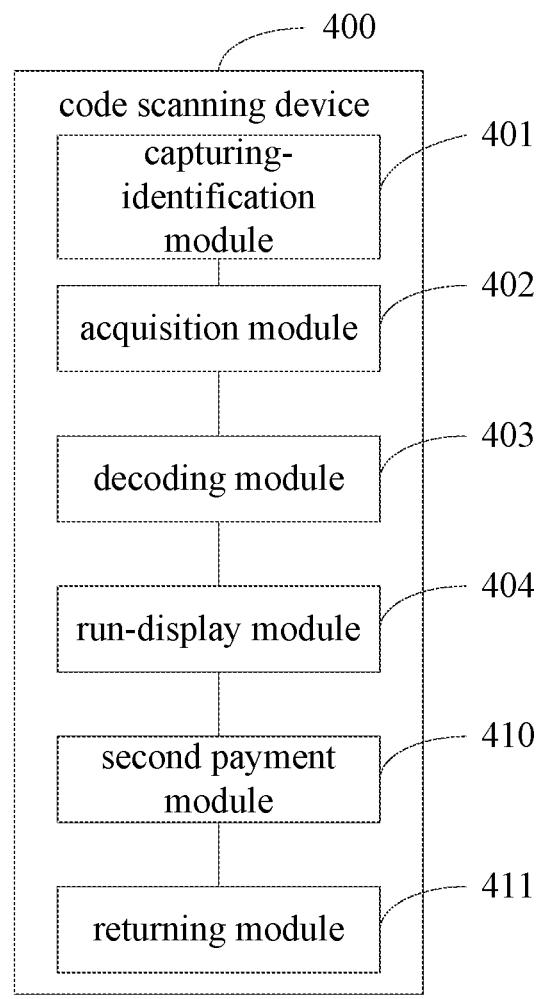
FIG. 8 is a block diagram of a code scanning device according to an embodiment of the present disclosure.

As shown in FIG. 8, the code scanning device 400 further includes:

a second payment module 410 used to, when an authorized payment operation is received, complete payment according to an input payment amount;

a returning module 411 used to close the target application and return to an interface displayed by the mobile terminal before displaying the payment interface.

The code scanning device 400 can implement various processes implemented by the mobile terminal in the method embodiments of FIG. 1 and FIG. 3, and details are not described herein again to avoid repetition. When the code scanning device 400 of the embodiment of the present disclosure scans a code, there is no need for the user to manually open the code-scanning application and open a code-scanning function, thereby greatly saving the user's operation time, providing higher scanning efficiency and improving the user's experience of using the mobile terminal to scan codes.

Figure 9:
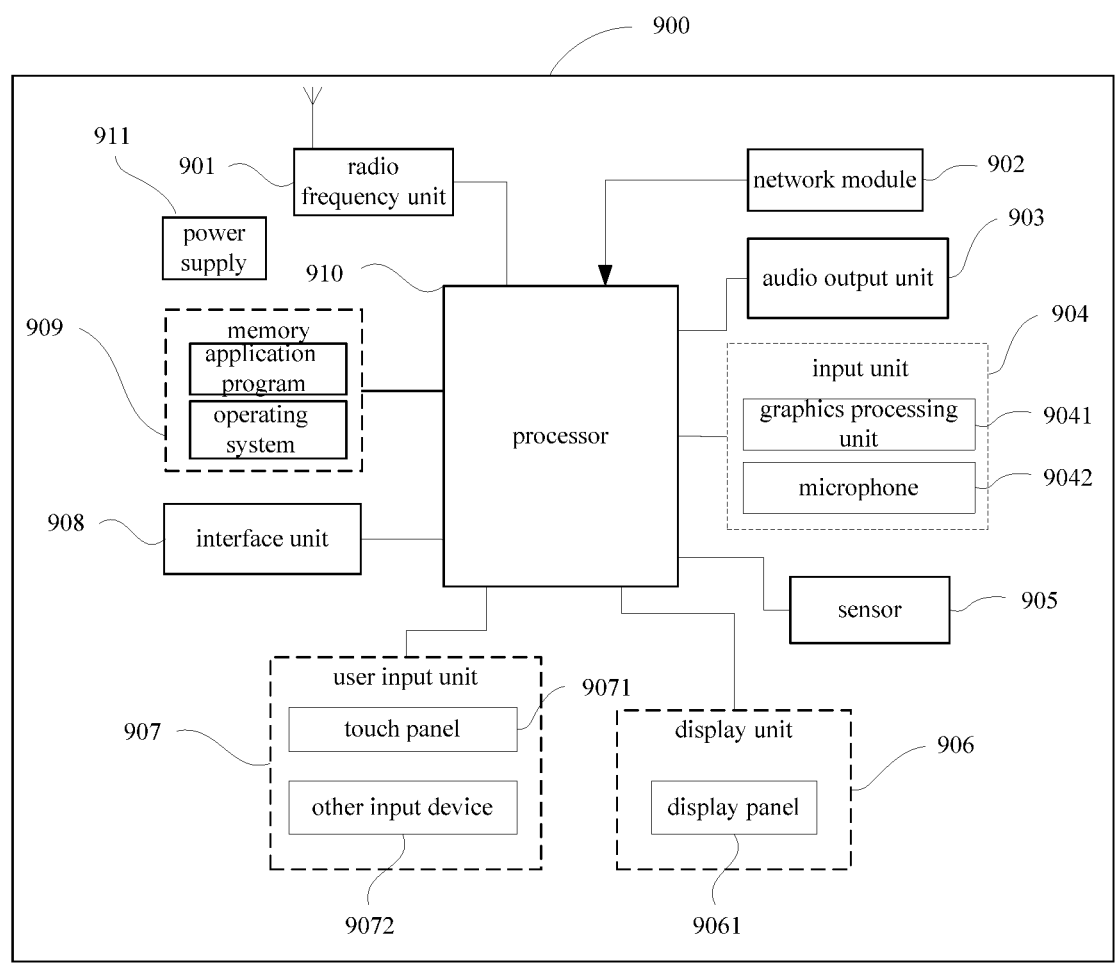
FIG. 9 is a block diagram of a mobile terminal according to an embodiment of the present disclosure.

FIG. 9 is a block diagram of a mobile terminal according to an embodiment of the present disclosure. When the mobile terminal is in a power-on state, a camera of the mobile terminal is normally on. The mobile terminal 900 includes, but is not limited to, a radio frequency unit 901, a network module 902, an audio output unit 903, an input unit 904, a sensor 905, a display unit 906, a user input unit 907, an interface unit 908, a memory 909, a processor 910, and a power supply 911. It will be appreciated by those skilled in the art that structures of the mobile terminal shown in FIG. 9 do not constitute a definition of the mobile terminal, which may include more or fewer components than illustrated, or have some components combined, or different component arrangements. In one embodiment of the present disclosure, the mobile terminal includes, but is not limited to, a mobile phone, a tablet computer, a notebook computer, a palmtop computer, an in-vehicle terminal, a wearable device, a pedometer, and the like.

The processor 910 is used to:

capture an image with the camera and identify a captured target image;

when identifying that the target image has an image feature of a preset graphic identification code, acquire a target graphic identification code in the target image;

decode the target graphic identification code to obtain an access link corresponding to the target graphic identification code; and run a target application corresponding to the access link, and display an access interface corresponding to the access link.

Optionally, the processor 910 is further used to:

identify whether the access link is a valid link;

extract key characters in the access link when the access link is identified as a valid link;

search for an application corresponding to the key characters from a preset database, and determine the application corresponding to the key characters as a target application.

Optionally, the processor 910 is further used to:

judge whether the mobile terminal is installed with the target application;

when determining that the mobile terminal is installed with the target application, run the target application installed on the mobile terminal, and display the access interface corresponding to the access link by the target application;

when determining that the mobile terminal is not installed with the target application, run an applet corresponding to the target application, and display the access interface corresponding to the access link by the appl et.

Optionally, the access interface includes a payment interface.

The processor 910 is further used to:

when a screen of the mobile terminal is in a screen-off state, capture an image with the camera of the mobile terminal and identify the captured target image;

light up the screen of the mobile terminal, run the target application corresponding to the access link, and display the access interface corresponding to the access link;

when an authorized payment operation is received, complete payment according to an input payment amount;

close the target application and close the screen of the mobile terminal.

Optionally, the access interface includes a payment interface.

The processor 910 is further used to:

when the screen of the mobile terminal is in a screen-on state, capture an image with the camera of the mobile terminal and identify the captured target image;

when an authorized payment operation is received, complete payment according to an input payment amount;

close the target application and return to an interface displayed by the mobile terminal before displaying the payment interface.

The mobile terminal 900 can implement various processes implemented by the mobile terminal in the foregoing embodiments, and details are not described herein again to avoid repetition. When the mobile terminal 900 of the embodiment of the present disclosure scans a code, there is no need for the user to manually open the code-scanning application and open a code-scanning function, thereby greatly saving the user's operation time, providing higher scanning efficiency and improving the user's experience of using the mobile terminal to scan codes.

It should be understood that in this embodiment of the present disclosure, the radio frequency unit 901 may be used to receive and transmit signals during receiving and transmitting information or a call. Specifically, the radio frequency unit 901 receives downlink data from a base station and then transmits the downlink data to the processor 910 for processing. Uplink data is transmitted to the base station. Generally, the radio frequency unit 901 includes, but is not limited to, an antenna, at least one amplifier, a transceiver, a coupler, a low noise amplifier, a duplexes, and the like. In addition, the radio frequency unit 901 may also communicate with the network and other devices through a wireless communication system.

The mobile terminal provides wireless broadband internet access to the user through the network module 902, such as assisting the user in receiving and transmitting email, browsing web pages, and accessing streaming media.

The audio output unit 903 may convert the audio data received by the radio frequency unit 901 or the network module 902 or stored in the memory 909 into an audio signal and output as sound. Moreover, the audio output unit 903 may also provide audio output (e.g., call signal reception sound, message reception sound, etc.) related to a specific function performed by the mobile terminal 900. The audio output unit 903 includes a speaker, a buzzer, a receiver, and the like.

The input unit 904 is used for receiving an audio or video signal. The input unit 904 may include a Graphics Processing Unit (GPU) 9041 and a microphone 9042. The GPU 9041 processes image data of static pictures or videos obtained by an image capturing apparatus (such as a camera) in a video capturing mode or an image capturing mode. The processed image frame may be displayed on the display unit 906. The image frames processed by the graphics processor 9041 may be stored in the memory 909 (or other storage medium) or transmitted via the radio frequency unit 901 or the network module 902. The microphone 9042 can receive sound and can process such sound into audio data. The processed audio data may be converted into a format output that may be transmitted to the mobile communication base station via the radio frequency unit 901 in the case of a telephone talk mode.

The mobile terminal 900 further includes at least one sensor 905, such as a light sensor, a motion sensor, and other sensors. Specifically, the light sensor includes an ambient light sensor and a proximity sensor. The ambient light sensor can adjust brightness of a display panel 9061 according to the brightness of the ambient light. The proximity sensor can turn off the display panel 9061 and/or backlight when the mobile terminal 900 moves to the ear. As one of the motion sensors, an accelerometer sensor can detect the magnitude of the acceleration in each direction (generally three axes), can detect the magnitude and direction of the gravity when stationary, and can be used to identify the attitude of the mobile terminal (such as horizontal/vertical screen switching, related games, magnetometer attitude calibration), vibration identification related functions (such as pedometer, knocking), and the like. The sensor 905 may further include a fingerprint sensor, a pressure sensor, an iris sensor, a molecular sensor, a gyroscope, a barometer, a hygrometer, a thermometer, an infrared sensor, and the like, which will not be elaborated herein.

The display unit 906 is used to display information input by or provided to the user. The display unit 906 may include a display panel 9061, which may be configured in the form of a Liquid Crystal Display (LCD), an Organic Light-Emitting Diode (OLED), or the like.

The user input unit 907 may be used to receive the input number or character information, and to generate a key signal input related to the user setting and the function control of the mobile terminal. Specifically, the user input unit 907 includes a touch panel 9071 and other input devices 9072. The touch panel 9071, also referred to as a touch screen, may collect touch operations on or near the touch panel (e.g., operations on or near the touch panel 9071 using any suitable object or accessory, such as a finger, stylus, or the like). The touch panel 9071 may include a touch detection device and a touch controller. The touch detection device detects a touch orientation of the user, detects a signal generated by the touch operation, and transmits the signal to the touch controller. The touch controller receives touch information from the touch detection device and converts it into contact coordinates, which are then transmitted to the processor 910, receives commands from the processor 910 and execute them. In addition, the touch panel 9071 may be implemented in various types such as a resistive type, a capacitive type, an infrared ray, and a surface acoustic wave. In addition to the touch panel 9071, the user input unit 907 may further include other input devices 9072. Specifically, other input devices 9072 may include, but are not limited to, a physical keyboard, a function key (such as a volume control key, an on-off key), a trackball, a mouse, and a joystick, which will not be elaborated herein.

Further, the touch panel 9071 may be overlaid on the display panel 9061. When the touch panel 9071 detects a touch operation on or near the touch panel, the touch panel 9071 transmits it to the processor 910 to determine a type of a touch event. Then, the processor 910 provides a corresponding visual output on the display panel 9061 according to the type of the touch event. Although in FIG. 9, the touch panel 9071 and the display panel 9061 are implemented as two separate components to implement the input and output functions of the mobile terminal, in some embodiments, the touch panel 9071 and the display panel 9061 may be integrated to implement the input and output functions of the mobile terminal, which are not specifically limited herein.

The interface unit 908 is an interface through which an external device is connected to the mobile terminal 900. For example, the external device may include a wired or wireless headset port, an external power (or battery charger) port, a wired or wireless data port, a memory card port, a port for connecting a device having an identification module, an audio input/output (I/O) port, a video I/O port, a headset port, and the like. The interface unit 908 may be used to receive input (e.g., data information, power, etc.) from the external device and transmit the received input to one or more elements within the mobile terminal 900 or may be used to transmit data between the mobile terminal 900 and the external device.

The memory 909 may be used to store software programs and various data. The memory 909 may mainly include a program storage area and a data storage area. The program storage area may store an operating system, an application program (such as a sound play function, an image play function) required by at least one function, and the like. The data storage area may store data (such as audio data, a phone book) created according to use of the mobile terminal. In addition, the memory 909 may include high speed random access memory, and may also include non-volatile memory, such as at least one magnetic disk storage device, flash memory device, or other volatile solid state storage device.

The processor 910 is a control center of the mobile terminal, connects various parts of the entire mobile terminal by various interfaces and lines, executes various functions of the mobile terminal and processes data by running or executing software programs and/or modules stored in the memory 909 and invoking data stored in the memory 909, thereby performing overall monitoring of the mobile terminal. The processor 910 may include one or more processing units. Optionally, the processor 910 may integrate an application processor and a modem processor. The application processor primarily processes the operating system, the user interface and the application program. The modem processor primarily processes wireless communications. It will be appreciated that the modem processor may also not be integrated into the processor 910.

The mobile terminal 900 may further include a power source 911 (such as a battery) that supplies power to the various components. Optionally, the power source 911 may be logically connected to the processor 910 through a power management system to perform functions such as managing charging, discharging, and power consumption management through the power management system.

In addition, the mobile terminal 900 includes functional modules not shown, which will not be elaborated herein.

Optionally, one embodiment of the present disclosure further provides a mobile terminal including a processor 910, a memory 909, and a computer program stored in the memory 909 and executable on the processor 910. When the computer program is executed by the processor 910, each of the processes in the code scanning method embodiment is implemented, and the same technical effect can be achieved. To avoid repetition, details are not described herein.

One embodiment of the present disclosure further provides a computer readable storage medium including a computer program stored thereon. The computer program is executed by a processor to implement each process of the above code scanning method embodiment, and the same technical effect can be achieved. To avoid repetition, details are not described herein. The computer-readable storage medium includes, for example, a Read-Only Memory (ROM), a Random Access Memory (RAM), a magnetic disk, or an optical disk.

It is to be noted that terms "comprise", "include" or any other variations are intended to encompass a non-exclusive inclusion, such that a process, method, system, commodity, or device that include a series of steps or elements include not only those steps or elements but also other steps or elements that are not explicitly listed, or steps or elements that are inherent to such process, method, commodity, or device. An element defined by the phrase "comprising a . . . " does not exclude the presence of additional equivalent elements in the process, method, commodity, or device including the element.

From the above description of the embodiments, it will be apparent to those skilled in the art that the method of the above embodiments may be implemented by means of software plus the necessary general hardware platform, but may be implemented by means of hardware, but in many cases the former is the preferred embodiment. Based on such an understanding, the technical solution of the present disclosure, in essence or in part contributing to the related art, may be embodied in the form of a software product stored in a storage medium (such as a ROM/RAM, a magnetic disk, or an optical disk) including instructions for causing a terminal (which may be a mobile phone, a computer, a server, an air conditioner, or a network device) to perform the methods described in the various embodiments of the present disclosure.

In this way, when scanning a code with the mobile terminal, there is no need for the user to manually open the code-scanning application and open a code-scanning function, thereby greatly saving the user's operation time, providing higher scanning efficiency and improving the user's experience of using the mobile terminal to scan codes.

The embodiments of the present disclosure have been described above in conjunction with the accompanying drawings, but the present disclosure is not limited to the specific embodiments described above. The specific embodiments described above are merely illustrative and not restrictive, and those of ordinary skill in the art will be able to make many forms without departing from the spirit of the disclosure and the scope of the claims, all of which fall within the protection of the disclosure.

What is claimed is:

1. A code scanning method applied to a mobile terminal with a camera normally-on when the mobile terminal is in a power-on state, the method comprising:

capturing an image with the camera and identifying a captured target image;

when identifying that the target image has an image feature of a preset graphic identification code, acquiring a target graphic identification code in the target image;

decoding the target graphic identification code to obtain an access link corresponding to the target graphic identification code; and running a target application corresponding to the access link and displaying an access interface corresponding to the access link;
wherein the access interface comprises a payment interface;
the step of capturing an image with the camera and identifying a captured target image, comprises: when a screen of the mobile terminal is in a screen-off state, capturing an image with the camera of the mobile terminal and identifying the captured target image;
the step of running a target application corresponding to the access link and displaying an access interface corresponding to the access link, comprises: lighting up the screen of the mobile terminal, running the target application corresponding to the access link and displaying the access interface corresponding to the access link;
after the step of lighting up the screen of the mobile terminal, running the target application corresponding to the access link and displaying the access interface corresponding to the access link, the method further comprises:
when an authorized payment operation is received, completing payment according to an input payment amount;
closing the target application and closing the screen of the mobile terminal.

2. The method according to claim 1, wherein after the step of decoding the target graphic identification code to obtain an access link corresponding to the target graphic identification code, the method further comprises:
identifying whether the access link is a valid link;
when the access link is identified as a valid link, extracting key characters in the access link;
searching for an application corresponding to the key characters from a preset database, and determining the application corresponding to the key characters as the target application.

3. The method according to claim 1, wherein the step of running a target application corresponding to the access link and displaying an access interface corresponding to the access link, comprises:
judging whether the mobile terminal is installed with the target application;
when determining that the mobile terminal is installed with the target application, running the target application installed on the mobile terminal, and displaying the access interface corresponding to the access link by the target application;
when determining that the mobile terminal is not installed with the target application, running an applet corresponding to the target application, and displaying the access interface corresponding to the access link by the applet.

4. A mobile terminal comprising: a processor, a memory, and a computer program stored on the memory and executable on the processor; wherein the computer program is executed by the processor to:
capture an image with a camera of the mobile terminal and identify a captured target image;
when identifying that the target image has an image feature of a preset graphic identification code, acquire a target graphic identification code in the target image;
decode the target graphic identification code to obtain an access link corresponding to the target graphic identification code; and
run a target application corresponding to the access link and display an access interface corresponding to the access link;
wherein the camera is normally-on when the mobile terminal is in a power-on state;
wherein the access interface comprises a payment interface;
the processor is used to:
when a screen of the mobile terminal is in a screen-off state, capture an image with the camera of the mobile terminal and identify the captured target image;
light up the screen of the mobile terminal, run the target application corresponding to the access link and display the access interface corresponding to the access link;
when an authorized payment operation is received, complete payment according to an input payment amount;
close the target application and close the screen of the mobile terminal.

5. The mobile terminal according to claim 4, wherein the processor is used to:
identify whether the access link is a valid link;
extract key characters in the access link when the access link is identified as a valid link;
search for an application corresponding to the key characters from a preset database and determine the application corresponding to the key characters as the target application.

6. The mobile terminal according to claim 4, wherein the processor is used to:
judge whether the mobile terminal is installed with the target application;
when determining that the mobile terminal is installed with the target application, run the target application installed on the mobile terminal and display the access interface corresponding to the access link by the target application;
when determining that the mobile terminal is not installed with the target application, run an applet corresponding to the target application and display the access interface corresponding to the access link by the applet.

* * * * *